US011188529B2

(12) United States Patent
Wittern et al.

(10) Patent No.: US 11,188,529 B2
(45) Date of Patent: Nov. 30, 2021

(54) AUTONOMOUS GENERATION OF A GRAPH QUERY LANGUAGE INTERFACE ON TOP OF AN APPLICATION PROGRAMMING INTERFACE

(71) Applicant: International Business Machines Corporation, Armonk, NY (US)

(72) Inventors: John Erik Wittern, New York, NY (US); Jim Alain Laredo, Katonah, NY (US); Alan Cha, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 15/996,745

(22) Filed: Jun. 4, 2018

(65) Prior Publication Data

US 2019/0370370 A1 Dec. 5, 2019

(51) Int. Cl.
*G06F 16/2455* (2019.01)
*G06F 16/2452* (2019.01)
(Continued)

(52) U.S. Cl.
CPC ............ *G06F 16/2452* (2019.01); *G06F 9/54* (2013.01); *G06F 16/213* (2019.01);
(Continued)

(58) Field of Classification Search
CPC ..... G06F 16/213; G06F 16/2452–2458; G06F 16/258; G06F 16/9024; G06F 9/54; G06F 16/242–248
See application file for complete search history.

(56) References Cited

U.S. PATENT DOCUMENTS 9,697,224 B1 * 7/2017 Factor .................. G06F 16/162
9,753,744 B1    10/2017 Wells et al.
(Continued)

FOREIGN PATENT DOCUMENTS

CN     107817996 A     3/2018

OTHER PUBLICATIONS

Ed-Douibi et al., EMF-REST: Generation of RESTful APIs from Models, Proceedings of the 31st Annual ACM Symposium on Applied Computing, 2016, 17 Pages.
(Continued)

*Primary Examiner* — Robert W Beausoliel, Jr.
*Assistant Examiner* — Nirav K Khakhar
(74) *Attorney, Agent, or Firm* — Amin, Turocy & Watson, LLP

(57) ABSTRACT

Techniques regarding autonomously generating one or more graph query language schemas are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an interface component, operatively coupled to the processor, that can generate a schema for a graph query language wrapper that can translate a query to a request against a target application programming interface. The schema can comprise a sanitation map that can delineate a relation between a raw data format expected by the target application programming interface and a sanitized data format exposed by the graph query language wrapper.

20 Claims, 10 Drawing Sheets

(51) Int. Cl.
  *G06F 9/54*    (2006.01)
  *G06F 16/21*   (2019.01)
  *G06F 16/25*   (2019.01)
  *G06F 16/901*  (2019.01)

(52) U.S. Cl.
  CPC ...... *G06F 16/24556* (2019.01); *G06F 16/258* (2019.01); *G06F 16/9024* (2019.01)

(56) References Cited

U.S. PATENT DOCUMENTS

| | | | |
|---|---|---|---|
| 9,804,886 B1 | 10/2017 | Wells et al. | |
| 2003/0023773 A1* | 1/2003 | Lee | G06F 9/541 719/328 |
| 2009/0239553 A1* | 9/2009 | Wright | G06F 16/9537 455/456.3 |
| 2010/0161593 A1* | 6/2010 | Paulsen | G06F 16/248 707/722 |
| 2011/0016160 A1* | 1/2011 | Zhang | G06F 16/24 707/805 |
| 2011/0161477 A1 | 6/2011 | Kowalski | |
| 2012/0143898 A1* | 6/2012 | Bruno | G06F 16/2425 707/769 |
| 2012/0254293 A1* | 10/2012 | Winter | H04Q 3/62 709/203 |
| 2014/0281708 A1* | 9/2014 | Adam | G06F 11/1443 714/18 |
| 2014/0372970 A1 | 12/2014 | Broussard et al. | |
| 2015/0089354 A1* | 3/2015 | Abrahami | G06F 16/958 715/235 |
| 2017/0286489 A1* | 10/2017 | Dantressangle | G06F 16/22 |
| 2018/0314622 A1* | 11/2018 | Lowe | G06F 9/44526 |
| 2019/0095318 A1* | 3/2019 | Bahrami | G06F 11/3676 |
| 2021/0006478 A1* | 1/2021 | Levitt | H04L 41/5009 |

OTHER PUBLICATIONS

Espinha, et al., Web API Growing Pains: Stories from Client Developers and Their Code, IEEE Conf. on Software Maintenance, Reengineering, and Reverse Engineering, Feb. 2014, pp. 84-93.
Facebook Inc., GraphQL, http://facebook.github.io/graphql/ October2016, Last Accessed May 24, 2018, 132 Pages.
Fielding, et al., Architectural Styles and the Design of Networkbased Software Architectures, 2000, 180 Pages.
Gossner, S., JSONPath—XPath for JSON. http://goessner.net/articles/JsonPath, Last Accessed Jun. 1, 2018. 5 pages. http://goessner.net/articles/JsonPath/.
Wright, et al. SON Schema: A Media Type for Describing JSON Documents. Last Accessed Jun. 1, 2018. 16 pages. http://json-schema.org/latest/json-schema-core.html.
Laitkorpi, et al. Towards a Model-Driven Process forDesigning ReSTful Web ServicesIn: 2009 IEEE Int. Conf. on Web Services, pp. 173-180. ICWS, IEEE (Jul. 2009).
Li, et al., How Does Web Service API Evolution Affect Clients? 2013 IEEE 20th Int. Conf. on Web Services, pp. 3oo-307. IEEE (Jun. 2013).
Maximilien, et al. A Domain-Specific Language for Web APIs and Services Mashups. Service-Oriented Computing. pp. 13-26. ICSOC, Springer Berlin Heidelberg (2007).
OpenAPI Specification, github.com, Last Accessed Jun. 1, 2018, 59 pages. https://github.com/OAI/OpenAPI-Specification/blob/master/versions/3.0.0.md/.
Rodriguez, et al. REST APIs: A Large-Scale Analysis of Compliance with Principles and Best Practices. Web Engineering, pp. 21-39. ICWE, Springer (2016).
Scheidgen, et al., Metamodeling vs Metaprogramming: A Case Study on Developing Client Libraries for REST APIs. Wasowski, A., Lönn, H. (eds.) Modelling Foundations and Applications, pp. 205-216. ECMFA, Springer Int. Publishing (2016).
Sohan, et al., Automated RESTful API Documentation Using an HTTP Proxy Server. Proc. of the 30th IEEE/ACM Int. Conf. on Automated Software Engineering. pp. 271-276. ASE, IEEE (2015).
Suter, et al., Inferring Web API Descriptions From Usage Dataof2015 Third IEEE Workshop on Hot Topics in Web Systems and Technologies. pp. 7-12. HotWeb, IEEE (2015).
Vaziri, et al., Generating Chat Bots from Web API Specifications. Proc. of the 2017 ACM SIGPLAN Int. Symposium an New Ideas, New Paradigms, and Reflections on Programming and Software, pp. 44-57. Onward!, ACM (2017).
Zolotas, et al., From requirements to source code: a Model-Driven Engineering approach for RESTful web services. Journal of Automated Software Engineering 24(4), 791-838 (Dec. 2017).
Brandwijk, Kim, et al., Reusing & Composing GraphQL APIs with GraphQL Bindings, blog.graph.cool, Graphcool, Jan. 12, 2017,10 pages. https://blog.graph.cool/reusing-composing-graphql-apis-with-graphql-bindings-80a4aa37cff5.
Marktanner, Nilan, et al. How to wrap a REST API with GraphQL, blog.graph.cool, Graphcool, Feb. 22, 2017,17 pages https://blog.graph.cool/how-to-wrap-a-rest-api-with-graphql-8bf3fb17547d.
Bryon, Lee, GraphQL: A data query language, Sep. 14, 2015, Last Accessed Jun. 1, 2018. 7 pages. https://code.facebook.com/posts/1691455094417024/graphql-a-data-query-language/.
GraphQL API v4, GitHub Developer, Last Accessed Jun. 1, 2018. 3 pages. https://developer.github.com/v4/.
Intro to GraphQL, Yelp, Last Accessed Jun. 1, 2018. 2 pages. https://www.yelp.com/developers/graphql/guides/intro.
Taylor, Scott, React, Relay and GraphQL: Under the Hood of The Times Website Redesign, nytimes.com, Jun. 29, 2017. 6 pages. https://open.nytimes.com/react-relay-and-graphql-under-the-hood-of-the-times-website-redesign-22fb62ea9764.
An in-browser IDE for exploring GraphQL. github.com. Last Accessed Jun. 1, 2018. 7 pages. https://github.com/graphql/graphiql.
Getting Started With GraphQL.js, graphql.github.io, Last Accessed Jun. 1, 2018. 3 pages. https://graphql.github.io/graphql-js/.
Convert Swagger 2.0 definitions to OpenAPI 3.0 (and validate/lint), github.com, Last Accessed Jun. 1, 2018. 4 pages. https://github.com/Mermade/swagger2openapi.
OpenAPI Specification, github.com, Last Accessed Jun. 1, 2018. 58 pages. https://github.com/OAI/OpenAPI-Specification/blob/master/versions/3.0.1.md#schema-object.
Create a GraphQL HTTP server with Express, github.com, Last Accessed Jun. 1, 2018. 5 pages. https://github.com/graphql/express-graphql.
Apis.guru Wikipedia for WEB APIs, apis.guru, Last Accessed Jun. 1, 2018. 5 pages. https://apis.guru/openapi-directory/.
Wikipedia for Web APIs. Directory of REST API definitions in OpenAPI 2.0/3.0 format, github.com, Last Accessed Jun. 1, 2018. 3 pages. https://github.com/APIs-guru/openapi-directory.
Language Translator, ibm.com, Last Accessed Jun. 1, 2018. 9 pages. https://www.ibm.com/watson/services/language-translator/.
Mermade Swagger 2.0 to OpenAPI 3.0.0 converter, mermade.org.uk, Last Accessed Jun. 1, 2018. 2 pages. https://mermade.org.uk/openapi-converter.
Swagger to GraphQL API adapter, github.com, Last Accessed Jun. 1, 2018. 2 pages. https://github.com/yarax/swagger-to-graphql.
Postgraphile, Instant GraphQL API for PostgreSQL database, graphile.org, Last Accessed Jun. 1, 2018. 6 pages. https://www.graphile.org/postgraphile/.
Automatically create a GraphQL server from a sqlite database, github.com, Last Accessed Jun. 1, 2018. 2 pages. https://github.com/bradleyboy/tuql.
Generate a GraphQL API based on your SQL database structure, github.com, Last Accessed Jun. 1, 2018. 3 pages. https://github.com/rexxars/sql-to-graphql.
Mel, et al., The NIST Definition of Cloud Computing: Recommendations of the National Institute of Standards and Technology. National Institute of Standards and Technology. Jan. 25, 2016. 7 pages.
Flow is a static type checker for javascript, flow.org, Last Accessed Jun. 1, 2018. 2 pages.

\* cited by examiner

|  | Succ. (%) | Errors (%) |
|---|---|---|
| OASGraph (non-strict) | 930 (97%) | 29 (3%) |
| OASGraph (strict) | 260 (27.1%) | 690 (72.9%) |
| Swagger2GraphQL | 501 (61.6%) | 368 (38.4%) |
| Error type | OASGraph (non-strict) | Swagger2GraphQL |
|---|---|---|
| Invalid OAS | 6 | 0 |
| Sanitation Error | 16 | 0 |
| Missing Ref | 7 | 7 |
| Name Conflict | 0 | 2 |
| Unknown Schema Type | 0 | 35 |
| No Get Operation | 0 | 20 |
| Unsanitized Name | 0 | 252 |
| Invalid Schema Type | 0 | 25 |
| Stack Overflow | 0 | 27 |
| Overall | 29 | 368 |
FIG. 5

GENERATING, VIA A SYSTEM OPERATIVELY COUPLED TO A PROCESSOR, A SCHEMA FOR A GRAPH QUERY LANGUAGE WRAPPER THAT TRANSLATES A QUERY TO A REQUEST AGAINST A TARGET API, WHEREIN THE SCHEMA COMPRISES A SANITATION MAP THAT DELINEATES A RELATION BETWEEN A RAW DATA FORMAT EXPECTED BY THE TARGET API AND A SANITIZED DATA FORMAT EXPOSED BY THE GRAPH QUERY LANGUAGE WRAPPER — 602

TRANSLATING, BY THE SYSTEM, THE QUERY TO A PLURALITY OF REQUESTS AGAINST THE TARGET API, WHEREIN THE REQUEST IS COMPRISED WITHIN THE PLURALITY OF REQUESTS, AND WHEREIN THE REQUEST IS RELATED TO A SECOND REQUEST FROM THE PLURALITY OF REQUESTS IN ACCORDANCE TO A LINK DEFINITION IN A MACHINE-READABLE SPECIFICATION OF THE TARGET API — 604

AUTONOMOUS GENERATION OF A GRAPH QUERY LANGUAGE INTERFACE ON TOP OF AN APPLICATION PROGRAMMING INTERFACE

BACKGROUND

The subject disclosure relates to generating a graph query language interface, and more specifically, to autonomously generating a schema for one or more graph query language wrappers that can translate one or more queries to one or more requests against one or more target application programming interfaces.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously generate a schema for one or more graph query language wrappers that can translate one or more queries to one or more requests against a target application programming interface are described.

According to an embodiment, a system is provided. The system can comprise a memory that can store computer executable components. The system can also comprise a processor, operably coupled to the memory, and that can execute the computer executable components stored in the memory. The computer executable components can comprise an interface component, operatively coupled to the processor, that can generate a schema for a graph query language wrapper that can translate a query to a request against a target application programming interface. The schema can comprise a sanitation map that can delineate a relation between a raw data format expected by the target application programming interface and a sanitized data format exposed by the graph query language wrapper.

According to an embodiment, a computer-implemented method is provided. The computer-implemented method can comprise generating, via a system operatively coupled to a processor, a schema for a graph query language wrapper that can translate a query to a request against a target application programming interface. The schema can comprise a sanitation map that can delineate a relation between a raw data format expected by the target application programming interface and a sanitized data format exposed by the graph query language wrapper.

According to an embodiment, a computer program product that automatically generates a graph query language schema is provided. The computer program product can comprise a computer readable storage medium having program instructions embodied therewith. The program instructions can be executable by a processor to cause the processor to generate, via a system operatively coupled to the processor, a schema for a graph query language wrapper that can translate a query to a request against a target application programming interface. The schema can comprise a sanitation map that can delineate a relation between a raw data format expected by the target application programming interface and a sanitized data format exposed by the graph query language wrapper.

BRIEF DESCRIPTION OF THE DRAWINGS

FIG. 5 illustrates a diagram of example, non-limiting tables that can depict the efficacy of one or more systems that can generate one or more schema for one or more graph query language wrappers, which can translate one or more queries to one or more requests against a target application programming interface in accordance with one or more embodiments described herein.

FIG. 6 illustrates a flow diagram of an example, non-limiting method that can facilitate autonomously generating one or more schema for one or more graph query language wrappers, which can translate one or more queries to one or more requests against a target application programming interface in accordance with one or more embodiments described herein.

DETAILED DESCRIPTION

Figure 1:
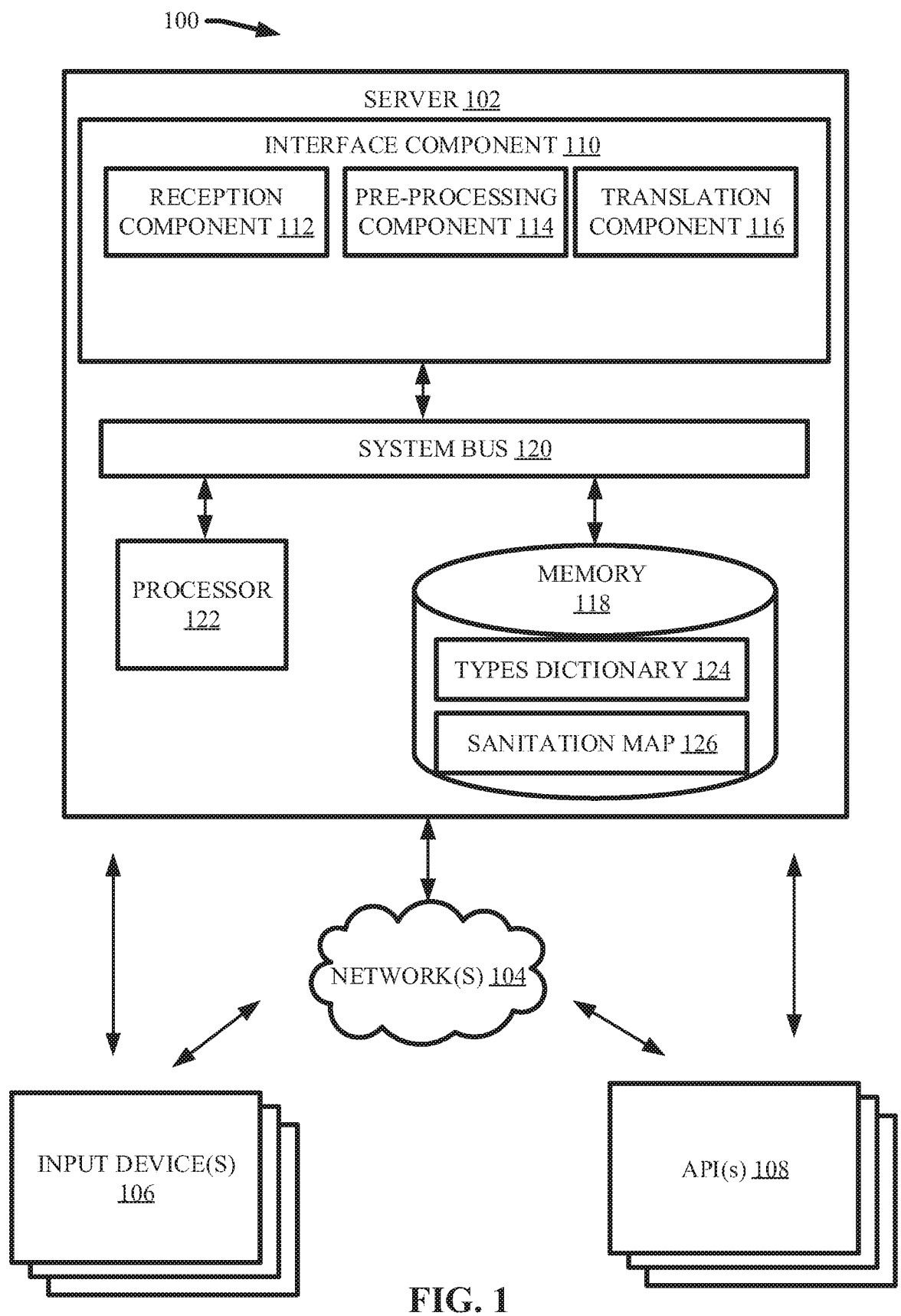
FIG. 1 illustrates a block diagram of an example, non-limiting system that can generate one or more schema for one or more graph query language wrappers, which can translate one or more queries to one or more requests against a target application programming interface in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In typical application programming interfaces ("APIs") (e.g., Representational State Transfer ("REST") architectural style APIs), resources can be identified by one or more Uniform Resource Identifiers ("URIs") and/or can be accessed and/or manipulated via one or more hypertext transfer protocol ("HTTP") endpoints. As a result, clients are limited to perform predetermined operations, which may have been designed by API providers irrespective of the clients' specific requirements. In consequence, clients frequently receive unneeded data, or have to chain multiple requests to obtain desired results. Furthermore, for API clients, changes to an API can have sever implications, and/or can lead to application misbehavior or even malfunctions. Additionally, APIs can amass endpoints when providers add new capabilities to an API to preserve compatibility (e.g., to react to new client requirements without breaking compatibility with existing clients).

Graph query languages can comprise graph-based data abstraction that can allow clients to specify exact data requirements (within provider-defined constraints) on a data field level, thereby avoiding the transmission of superfluous data over the network. Changes to client-specific requirements can be resolved by changing queries, rather than having to add endpoints to the API. A graph-based data abstraction allows providers to add new capabilities to their data model without breaking client code. Further, nested queries can allow the combination of multiple requests, thereby reducing client code complexity and/or avoiding associated overhead. However, to offer a graph query language interface, providers have to implement, operate and/or evolve said interface (e.g., possibly in addition to existing APIs, such as REST-like APIs).

Various embodiments of the present invention can be directed to computer processing systems, computer-implemented methods, apparatus and/or computer program products that facilitate the efficient, effective, and autonomous (e.g., without direct human guidance) generation of one or more schemas that can facilitate and/or define one or more graph query language wrappers. For instance, one or more embodiments described herein can leverage existing APIs (e.g., REST and/or REST-like APIs) and their machine-readable specifications to automatically generate one or more graph query language wrappers, which can resolve one or more queries by performing requests against the existing API. For example, one or more embodiments described herein can regard generating a sanitation map and/or types dictionary to document relations of data types expected by the existing API and/or data types exposed by the graph language query interface. Further, one or more embodiments can regard autonomously generating one or more schemas for one or more graph query language wrappers that can resolve nested queries. Moreover, various embodiments can autonomously generate one or more schemas for one or more graph query language wrappers that can incorporate one or more authentication protocols.

The computer processing systems, computer-implemented methods, apparatus and/or computer program products employ hardware and/or software to solve problems that are highly technical in nature (e.g., generating one or more schema for one or more graph query language wrappers that can translate one or more queries to one or more requests against an existing API), that are not abstract and cannot be performed as a set of mental acts by a human. For example, an individual, or even a plurality of individuals, cannot readily collect, maintain, and/or analyze vast volumes of data as expeditiously and/or efficiently as the various embodiments described herein. Additionally, one or more embodiments described herein can utilize AI technologies that are autonomous in their nature to facilitate determinations and/or predictions that cannot be readily performed by a human.

As used herein, the term "graph query language" can refer to a graph-based data abstraction for APIs. An example graph query language can be GraphQL. A graph query language can, for example: give one or more clients of an API a complete description of the data comprised within the API, enable one or more clients of an API to make specified queries and/or requests, and/or facilitate evolving an API over time. One or more interactions using graph query language can comprise the following.

A graph query language server can implement a graph query language schema that can define the types and/or relations of exposed data, including, for example, operations to query and/or mutate data. For example, a schema can define a user data as an object that contains string fields for an identification and/or name, an object field for an address, and/or string fields for a street and/or a city, wherein one or more clients of the graph query language server can query users by providing a string identification argument. Data types can be associated with one or more resolve functions, which can implement operations against one or more arbitrary backend systems, such as a database. A graph query language client can introspect a server's schema (e.g., by querying the server with one or more graph query language queries) to learn about exposed data types and/or possible operations. For example, the GraphQL online-integrated development environment ("IDE") can use introspection to allow developers to familiarize themselves with GraphQL schemas. For instance, one or more clients can send one or more queries to the graph query language server, wherein the queries can be characterized by having syntax that can resemble that of JSON and/or can specify desired operations to perform and/or what data to return (e.g., on the level of fields of objects). Upon receiving the one or more queries, the graph language query server can validate them against the schema and/or execute them by invoking one or more resolve functions to fetch the requested data and/or perform the desired mutations. Subsequently, the graph language query server can send the requested data to the one or more clients, and/or generate an error message in the case of a failed execution.

As used herein, the term "open API specification ("OAS")" can refer to a standard, machine readable programming language-agnostic interface description for one or more APIs. For example, Swagger is an OAS for REST APIs that was released as OpenAPI Specification 2.0 in 2015 and/or then OpenAPI Specification 3.0. The OAS can be a format used by service providers to describe and/or document APIs in an organized and/or predictable manner. Both human and machine-based clients can use OAS to understand and invoke APIs, including tooling that works for any API described using OAS. An OAS can break an API down into operations identified by a unique combination of URI path and/or HTTP method, the data in and/or output schemas (e.g., both for successful responses as well as errors), required parameters (e.g., in headers or query strings), and/or authentication mechanisms.

FIG. 1 illustrates a block diagram of an example, non-limiting system 100 that can autonomously generate one or more graph query language schemas in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more input devices 106, and/or one or more APIs 108. The server 102 can comprise interface component 110. The interface component 110 can further comprise reception component 112, pre-processing component 114, and/or translation component 116. Also, the server 102 can comprise or otherwise be associated with at least one memory 118. The server 102 can further comprise a system bus 120 that can couple to various components such as, but not limited to, the interface component 110 and associated components, memory 118 and/or a processor 122. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or the one or more APIs 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in an embodiment shown the interface component 110 can be provided on the one or more servers 102, it should be appreciated that the architecture of system 100 is not so limited. For example, the interface component 110, or one or more components of interface component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

The one or more APIs 108 can comprise one or more sets of computer programming definitions, protocols, and/or tools for building one or more software applications. For instance, an API 108 can clearly define one or more methods of communication between various software components. One or more APIs 108 can be applicable for web-based systems, operating systems, database systems, and/or computer hardware systems. For example, one or more web service APIs 108 can comprise software and/or systems that can provide access to services via an address (e.g., a URI) on the World Wide Web. Example web service APIs 108 can include, but are not limited to: simple access protocol ("SOAP") APIs, extensible markup language-remote procedure call ("XML-RPC") APIs, javascript object notation-remote procedure call ("JSON-RPC") APIs, REST APIs, a combination thereof, and/or the like. Further, one of ordinary skill in the art will recognize that the one or more APIs 108 can be customized with regards to a particular service platform and thereby may not fully adhere to the constraints prescribed by a given API 108 category. For example, a REST-like API 108 can be a variant of the REST architectural style that does not fully adhere to one or more constraints conventionally prescribed by REST.

In one or more embodiments, the interface component 110 can generate one or more schema for one or more graph query language wrappers to translate one or more queries to one or more requests against the one or more APIs 108. The one or more queries can be entered into the system 100 (e.g., the interface component 110) by, for example, the one or more input devices 106 (e.g., via the one or more networks 104). Additionally, the server 102 (e.g., the interface component 110) can receive one or more OASs, which can facilitate generation of the one or more schema and/or graph language query wrappers. In one or more embodiments, the interface component 110 can receive as an input one or more OAS (e.g., received from the one or more APIs 108) describing the one or more APIs 108 and generate one or more graph query language schemas that, once deployed, can form a graph query language wrapper around one or more target APIs 108. The graph query language wrapper can translate one or more queries (e.g., received from the one or more input devices 106) to corresponding requests against the one or more target APIs 108. The one or more schemas can comprise of: the data types expected and/or exposed by the wrapper and their relations; and/or one or more resolve functions responsible for receiving and/or returning data by making requests to the one or more target APIs 108.

The reception component 112 can receive data (e.g., one or more queries) entered by a user of the system 100 via the one or more input devices 106 and/or the one or more OASs from the one or more APIs 108. The reception component 112 can be operatively coupled to the one or more input devices 106 and/or one or more APIs 108 directly (e.g., via an electrical connection) or indirectly (e.g., via the one or more networks 104). Additionally, the reception component 112 can be operatively coupled to one or more components of the server 102 (e.g., one or more components associated with the interface component 110, system bus 120, processor 122, and/or memory 118) directly (e.g., via an electrical connection) or indirectly (e.g., via the one or more networks 104).

In one or more embodiments, the one or more graph query language schema generated by the interface component 110 can use graph query language types to define the data being sent to or returned from the server 102. For example, graph query language (input)object types can define the structure of JSON objects and can contain named fields whose values can either be other (input)object types, list types, enumeration types, and/or scalar types. Example scalar types can include, but are not limited to: an integer type, which can be a signed 32-bit integer; a float type, which can be a signed double-precision floating-point value; a string type, which can be an 8-bit unicode transformation format ("UTF-8"); a boolean type, which can be true or false, a combination thereof, and/or the like. List types can contain items of any other type, while enumeration types can define allowed values of a string type.

To define the graph query language types of a target API 108, the interface component 110 can make use of the schema objects defined in that API's 108 OAS. Schema objects can largely comply with the JSON schema specification, which is a format used to describe the structure of JSON data. Often, schema objects can be directly mapped to graph query language types. For example, JSON schema objects can map to graph query language (input)object types; JSON schema arrays can map to graph query language list types; and/or JSON schema enumerations can map to graph query language enumeration types. Similarly, scalar types in JSON schema like string, boolean, or number/integer can map to corresponding graph query language scalar types. The interface component 110 can iterate through a subject OAS' schema objects and/or instantiate corresponding graph query language types.

The pre-processing component 114 can analyze the subject OAS and perform a de-duplication process to avoid duplicate (input)object types in defining the graph query language types. (Input)object types in a single graph query language schema need to have unique names as identifiers. Duplicate graph query language types, with different names, can lead to bloated graph query language schemas and/or can possibly cause users confusion. However, the OAS of one or more target APIs 108, while providing a reference mechanism to foster reuse of schema objects defined in a central components object, does not enforce their de-duplication.

The pre-processing component 114 can facilitate avoiding the duplication of graph query language types with common names by selectively populating a types dictionary 124. The types dictionary 124 can be stored in the memory 118, which can be located in the server 102 and/or a cloud computing environment (e.g., accessible via the one or more networks 104). The types dictionary 124 can comprise one or more schema objects (e.g., all schema objects) defined across one or more operations (e.g., all operations) in an OAS. In one or more embodiments, the pre-processing component 114 only adds a new OAS schema object to the types dictionary 124 if a deep comparison attests that the new schema object is unique. For example, nested object types can be compared at one or more levels by, for instance, iterating through the nested object types and/or comparing their respective fields with one another, wherein a recursive algorithm can be used to address arbitrary nesting. Thus, the pre-processing component 114 can populate the types dictionary 124 with additional schema objects defined in the one or more subject OAS based on a comparison of the additional schema objects to one or more schema object already comprised within the types dictionary 124, such that only unique schema objects are added to the types dictionary 124. Additionally, in one or more embodiments the pre-processing component 114 can further flatten out one or more nested schema objects. For example, if a schema defines an object with properties that are themselves objects, dedicated entries for the latter can be created in the types dictionary 124.

The pre-processing component 114 can further extend the types dictionary 124 by creating a one or more unique name strings to associate types with the operations that consume/produce data of that type, and/or to identify entries in the types dictionary 124. From a given OAS, names can be derived from an explicit reference to the schema object if it appears in the components object of an OAS (e.g., user from "#/components/schema/User"), or from an explicitly set title value in the schema object (if present). If an OAS schema object is not referenced and/or does not have a title, or if any of these values has already been used in the types dictionary 124, the pre-processing component 114 can create the one or more names in the following manner: wherein the schema object was referenced from an operation, a concatenation of this operations HTTP method and URI path can be used; and/or wherein the schema object stems from the definition of another, complex schema object, the key identifying the schema object in that context can be used.

The translation component 116 can create one or more graph query language types by translating the schema objects comprised within the types dictionary 124. The one or more graph query language types created by the translation component 116 can instantiate the one or more schema objects defined within the types dictionary 124 and/or derived from a OAS regarding the one or more target APIs 108. The translation process performed by the translation component 116 can vary depending on the schema object subject to translation.

For example, wherein the schema object defines a scalar type (e.g., a string, number, or boolean), a corresponding graph query language scalar type can be created by the translation component 116. As an exception, wherein the schema object defines a string type but one or more valid enumeration values are defined, the translation component 116 can create a corresponding graph query language enumeration type.

In another example, wherein the schema object defines an object, one or more of the object's properties (e.g., in JSON schema terms) can be traversed and/or corresponding fields can be added to a new (input)object type. Here, an (input) object type can be created if the schema object defines the payload of any operation, and/or a normal object type can be created if the schema object defines the response data of any operation. The values of the created fields can themselves be graph query language types, reflecting again the JSON schema property types. In consequence, a recursive algorithm can translate possibly nested objects and/or create equally nested (input)object types. Once created, (input) object types can be stored in the types dictionary 124 for possible reuse. In cases where an object's property is itself of an object type, the corresponding graph query language type can then either be referenced (if it had already been translated), or the translation of that type is triggered.

In a further example, wherein the schema object defines an array, first, a new graph query language type describing the array's items can be created by the translation component 116. Once a graph query language type defining the items has been created, it can be wrapped in a graph query language list type.

In any of the translation processes described herein, the translation component 116 can wrap properties marked as required in a schema object in one or more graph query language nonnull types to express the same requirement, thereby requiring users to provide all data required by the one or more target APIs 108. Any schema object with human-readable description can be exposed in the created graph query language types and/or made available to developers during introspection.

The translation component 116 can further generate one or more sanitation maps 126 that can delineate one or more relations between a raw data format expected by the one or more target APIs and a sanitized data format exposed by the graph query language wrapper. The one or more sanitation maps 126 can be stored in the memory 118, which can be located on the server 102 and/or in a cloud computing environment (e.g., accessible via the one or more networks 104). Names of graph query language types, arguments, and/or (input)object type fields need to follow a graph query language data format. For example, the graph query language data format can require the names of graph query language types, arguments, and/or (input)object type fields to start with underscore ("_") or a letter and/or can contain only underscores and alpha-numerics. Because the restrictions for the graph query language data format do not exist for one or more APIs 108 (e.g., REST-like) defined in an OAS, sanitation requires to remove any non-supported characters from the raw data format of the OAS. Sanitation, however, has multiple effects: first, it causes the graph query language wrapper to deviate from the one or more APIs 108 (e.g., REST-like); second, the resolve functions of the graph query language wrapper need to un-sanitize data it sends to the one or more target APIs 108 (e.g., translate the graph query language data format into the raw data format expected by the APIs 108), and sanitize responses to the one or more requests (e.g., translate the raw data format into the graph query language data format) for the responses to match with the sanitized graph query language schema. For this purpose, a mapping between raw and sanitized values needs to be built up during type creation and made accessible to the resolve functions. Thus, the one or more sanitation maps 126 delineate how to manipulate given data to be compatible with either a raw data format expected by the target application programming interface and/or a sanitized data format exposed by the graph query language schema and/or wrapper. For example, the sanitation map 126 can delineate, for a given piece of data, one or more characters to be added and/or removed during the translation process to render the data compatible with either the graph query language schema and/or the one or more target APIs 108.

Figure 2:
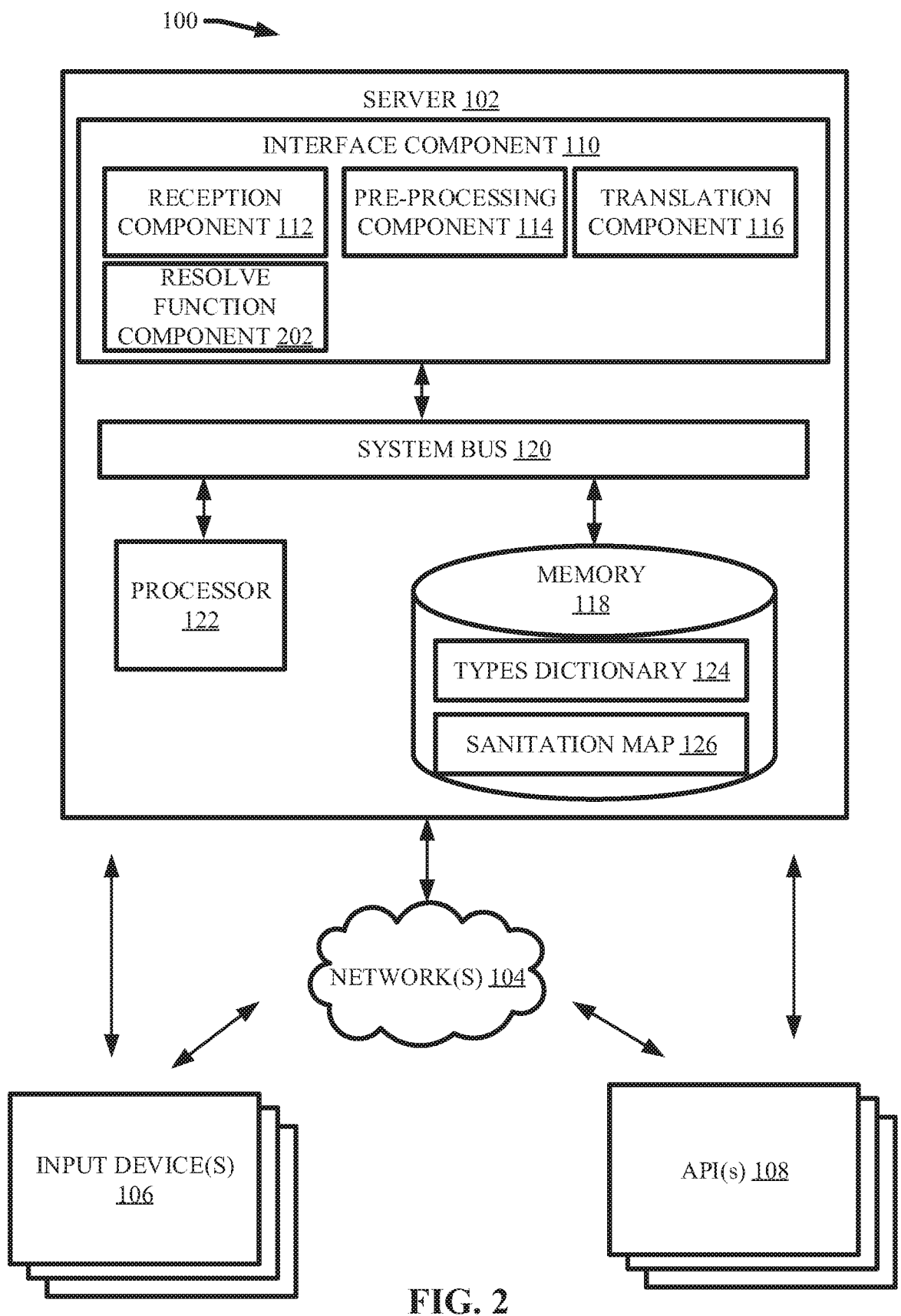
FIG. 2 illustrates a block diagram of an example, non-limiting system that can generate one or more schema for one or more graph query language wrappers, which can translate one or more queries to one or more requests against a target application programming interface in accordance with one or more embodiments described herein.

FIG. 2 illustrates a block diagram of the example, non-limiting system 100 further comprising resolve function component 202 in accordance with one or more embodiments described herein. Repetitive description of like elements employed in other embodiments described herein is omitted for sake of brevity. The resolve function component 202 can generate the one or more request by transforming the one or more queries from the sanitized data format to the raw data format based on the types dictionary 124 and/or the sanitation map 126.

Resolve functions can make one or more requests to the one or more target APIs 108 in response to graph query language queries, to either retrieve and/or mutate data. Resolve functions can be created and/or returned by the resolve function component 202 for a given operation defined in an OAS. In one or more embodiments, the resolve function component 202 can bind information from an OAS needed by the resolve function to perform requests during their creation. For example, the resolve function component 202 can bind an operation's base URI, uniform resource locator ("URL") path, HTTP method, and/or information about supported authentication mechanisms. Furthermore, the resolve function component 202 can bind a mapping between the names of arguments that a resolve function may receive as input from a query and/or the instructions for sending those arguments as parameters of a request to the one or more target APIs 108. For instance, in REST-like APIs 108, identifiers of resources and/or other smaller pieces of data can be typically sent as path parameters and/or query parameters and/or in headers. Whereas, more complex data can typically be sent as payload in the request body of, for example, POST, PUT, or PATCH requests. Finally, resolve functions generated by the resolve function component 202 can be aware of default values, which, if defined, can be used if a query does not provide a value for an argument. Wherein said information can be found as part of the OAS.

Resolve functions generated by the resolve function component 202 can receive and/or process other pieces of information at runtime, including data received from previous, parent resolve functions, this being a default behavior of the graph query language. Resolve functions can also receive security-related information like API keys, credentials, or OAuth/OpenID connect tokens via a context object that is available across resolve functions. Additionally, arguments used in previous requests can also be passed down at runtime, so that they need only be defined once per query, even if used by multiple resolve functions. The sanitation map 126 can be utilized by the resolve function component 202 in at least the following two ways. Before sending a request, passed argument names can be de-sanitized. For example, the received argument {"id": 1} may be de-sanitized to {"$id": 1}, as the one or more target APIs 108 expect a payload in the latter form. After receiving a response from the one or more target APIs 108, resolve functions can sanitize received data for it to be properly handled by the graph query language runtime. The sanitation and/or de-sanitation can be of a recursive nature as it can cover nested objects and/or arrays to assign the requested returned values.

Figure 3:
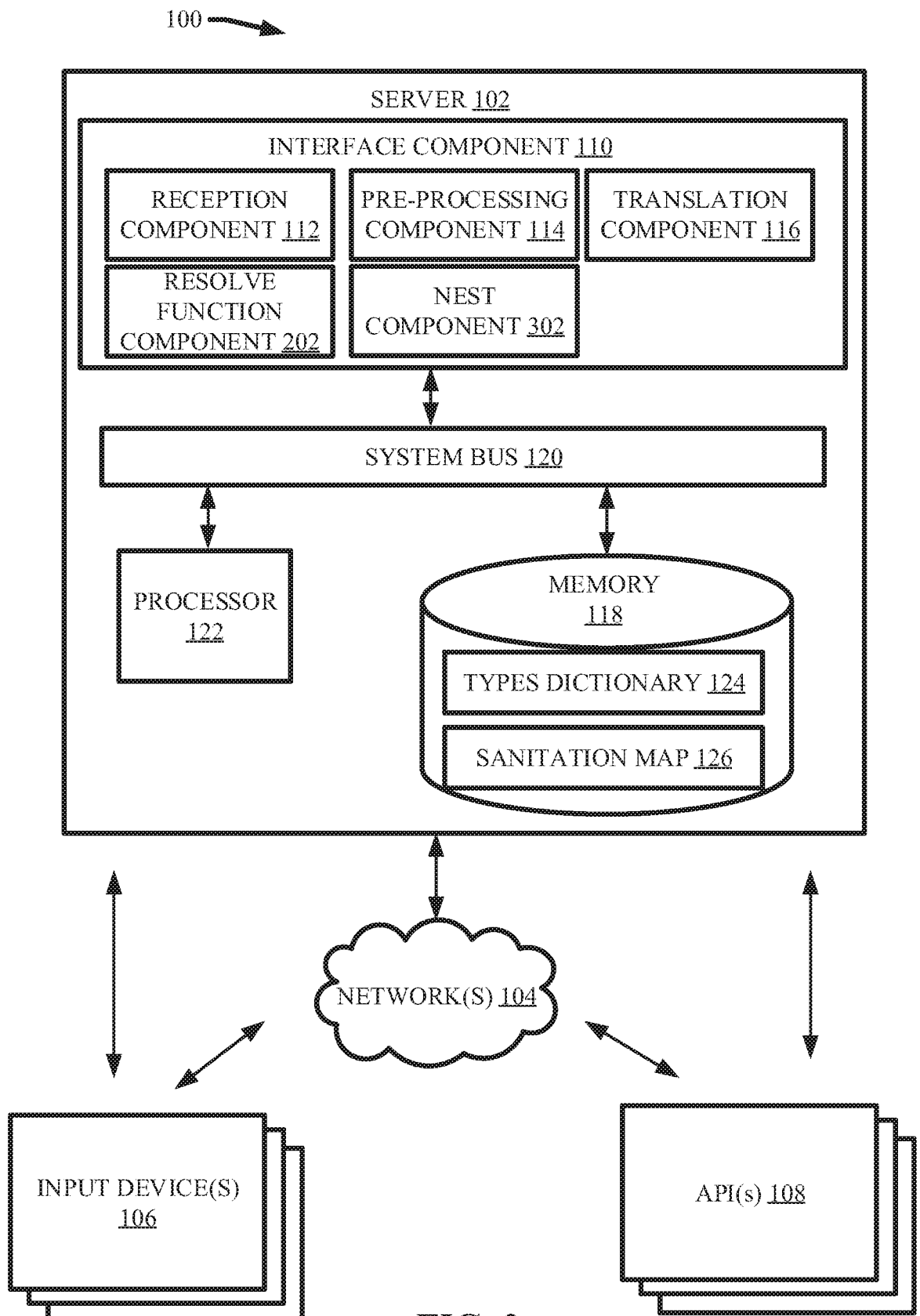
FIG. 3 illustrates a block diagram of an example, non-limiting system that can generate one or more schema for one or more graph query language wrappers, which can translate one or more nested queries to one or more requests against a target application programming interface in accordance with one or more embodiments described herein.

FIG. 3 illustrates a block diagram of the example, non-limiting system 100 further comprising nest component 302 in accordance with one or more embodiments described herein. Repetitive description of like elements employed in other embodiments described herein is omitted for sake of brevity. The nest component 302 can translate a subject query into to a plurality of requests against the one or more target APIs 108, wherein the plurality of requests can be related to each other in accordance to a link definition in the OAS. Thereby, the nest component 302 can consolidate multiple requests through nesting, wherein a nested query can result in multiple requests against the one or more target APIs 108.

In one or more embodiments, the graph query language schema can query nested data in single request. In the one or more APIs 108 (e.g., REST and/or REST-like APIs 108), similar operations can involve multiple requests. An OAS can define possible combinations of requests using links, wherein a link can provide design-time information about the relationships between the response of a request and possibly subsequent requests, which can depend on this response. For example, a link definition of an OAS written in yet another markup language ("YAML") can state that "employerId" returned in the payload when invoking "GET . . . /user/{id}" can be used to instantiate a "companyName" parameter in a request to a "getCompanyById" operation. A link defined in an OAS operation can create an additional field in the operation's response graph query language object type. The name of said field can be the identifier (e.g., sanitized) of the link (e.g., "EmployerCompany") and the type of said field can be the type of the response data of the linked operation. For instance, a client can fetch data on a user with id "erik" and/or use the field "employerCompany", created based on the link, to also fetch the employer's company name. For such queries to work, the nest component 302 can enable the resolve functions to be able to receive parameters from previous, parent resolve functions. For example, a first resolve function can invoke an exemplary "getUserById" operation and/or pass a received exemplary "employerId" field to a second resolve function that can uses this data to invoke an exemplary "getCompanyById" operation.

Figure 4:
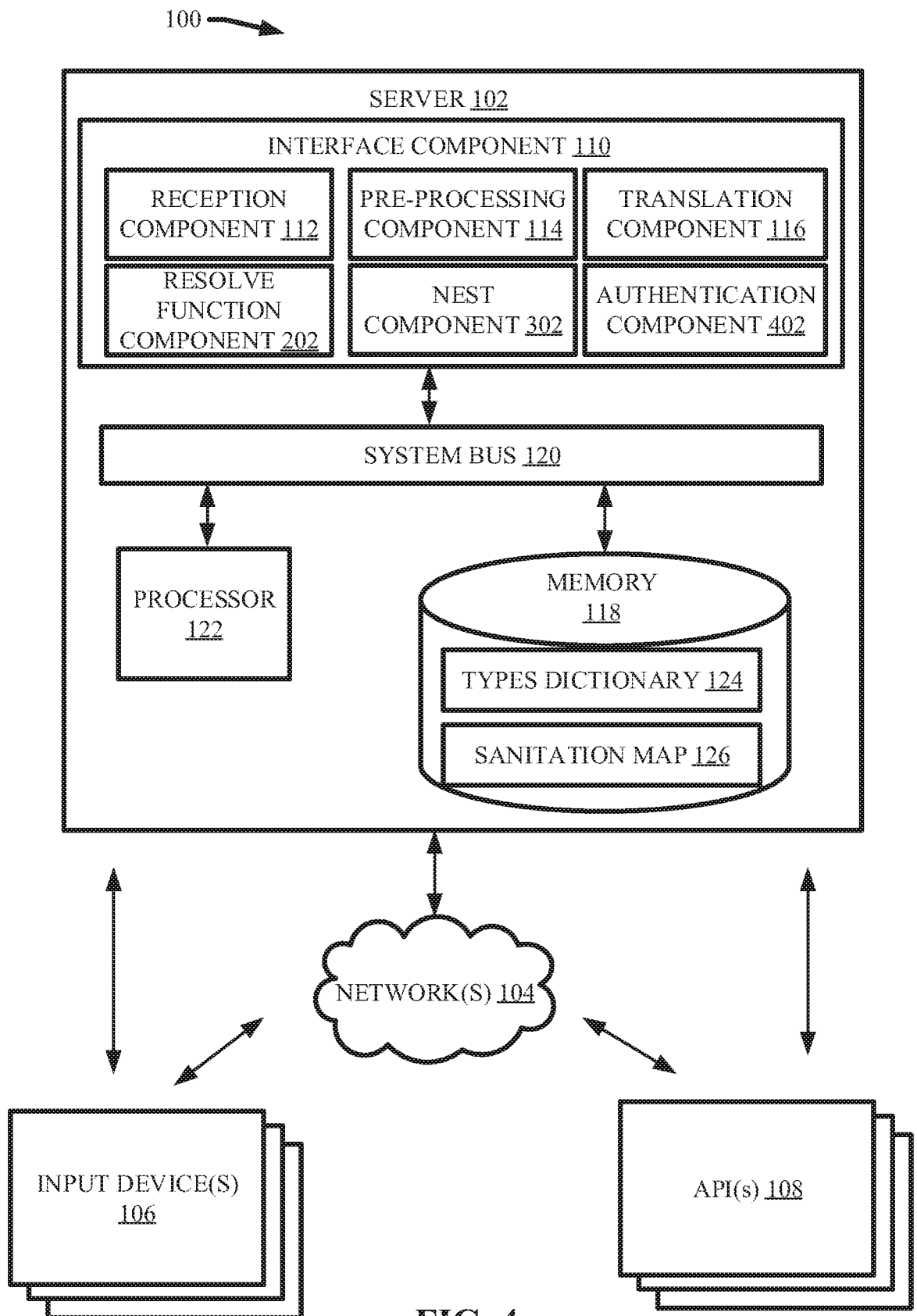
FIG. 4 illustrates a block diagram of an example, non-limiting system that can generate one or more schema for one or more graph query language wrappers, which can translate one or more queries to one or more requests and/or acquire appropriate authorization credentials against a target application programming interface in accordance with one or more embodiments described herein.

FIG. 4 illustrates a block diagram of the example, non-limiting system 100 further comprising authentication component 402 in accordance with one or more embodiments described herein. Repetitive description of like elements employed in other embodiments described herein is omitted for sake of brevity. In one or more embodiments, one or more graph query language wrappers derived from the one or more graph query language schemas can implement, for example via the authentication component 402, required API 108 authentication mechanisms, such as, but not limited to: API 108 key and/or basic authentication; and/or OAuth 2 and/or OpenID Connect in graph query language wrappers.

With regards to API 108 key and/or basic authentication, the authentication component 402 can generate one or more authentication viewers provide a mechanism to allow users to pass authentication information (e.g., API 108 keys, username, and/or password). The one or more authentication viewers can be special graph query language (input)object types that can wrap all other graph query language (input) object types whose resolve functions require authentication. The one or more authentication viewers can define one or more mandatory arguments, API 108 keys, and/or username and passwords and propagate their values to the resolve functions of one or more wrapped types. Further, the one or more authentication viewers can place sensitive credentials in graph query language queries, that can require dedicated security mechanisms (e.g., transport encryption).

Further, in one or more embodiments the authentication component 402 can use OAuth 2 and/or OpenID Connect to facilitate one or more API 108 authentication mechanisms. OAuth 2 is an authorization framework where users rely on a third-party service's OAUTH server to authenticate and/or authorize certain actions of an application. Applications are registered with the OAUTH server, and subsequently forward users to the server. Users authenticate themselves with the OAUTH server, which returns access tokens to the application. The application uses the tokens to interact with protected resources. OpenID Connect is a layer on top of OAuth 2 prescribing the use of JSON web token, equivalent to OAuth 2 for the purpose of a graph query language wrapper. The flow outlined above is independent of a graph query language wrapper itself, rather, it can rely on the application (e.g., the server 102, via the authentication component 402) to obtain the necessary tokens. The resolve functions of a graph query language schema and/or wrapper can: obtain access tokens from an application, and/or send said access tokens within requests to the one or more target APIs 108 (e.g., REST and/or REST-like APIs 108), typically by including them in an authorization header.

In one or more embodiments, having translated (e.g., via the translation component 116) OAS schema objects to graph query language types (e.g., relying on a types dictionary 124 and/or possibly considering links) and/or having defined resolve functions (e.g., via the resolve function component 202) for one or more operations, the interface component 110 can create an overall graph query language schema, which can define one or more possible queries and/or mutations. If authentication viewers were created (e.g., via the authentication component 402), they can be added (e.g., via the interface component 110) as root elements to the queries and/or mutations fields. Then, for one or more operations defined in a given OAS regarding one or more target APIs 108, the created response type, input types (forming arguments), and/or resolve function can be collectively added to the query or mutation fields of the schema (e.g., via the interface component 110), depending on whether the HTTP method of the operation is GET or not, either directly, or within the previously added authentication viewers they depend on. The resulting graph query language schema can be deployed to start receiving queries.

To demonstrate the efficacy and/or efficiency of the various embodiments described herein, a proof-of-concept server 102 was created and herein referred to as "OASGraph." The OASGraph was written in JavaScript using the flow static type checker, and/or relied on the GraphQL reference implementation GraphQL.js. The OASGraph further relied on the third-party library "swagger2openapi" to translate given OAS 2.0 (Swagger) specifications to OAS 3.0.0 and/or to validate that provided specifications were syntactically correct.

In accordance with one or more embodiments described herein, the OASGraph performed a pre-processing phase (e.g., via the pre-processing component 114) to deduplicate and/or name schema objects before recursively translating them (e.g., via the translation component 116) to GraphQL types while sanitizing type, argument, and field names. During the translation, the OASGraph resolved (e.g., via the resolve function component 202) possibly encountered references within the given OAS (e.g., $ref: "#/components/schemas/User") as well as "allOf" definitions and/or enriched object types with fields stemming from link definitions (e.g., via the nest component 302). The OASGraph further generated authentication viewers (e.g., via the authentication component 402) for passing API 108 keys and/or basic authentication credentials, as well as one or more authentication viewers that can take as arguments multiple authentication information at once, thereby allowing nested queries to rely on more than one authentication mechanism. After creating resolve functions per operation in the given OAS (e.g., via the resolve function component 202), the OASGraph combined them with the generated types and authentication viewers to form a GraphQL schema. The OASGraph further enables a JsonPath option that points resolve functions to the location of authentication tokens in the global context object, which can be used to provide resolve functions access to OAuth 2 and/or OpenID Connect tokens made available in the context by the application deploying the GraphQL interface.

Additionally, the OASGraph provided two modes of operation. In strict mode, the OASGraph will provide errors in light of missing and/or ambiguous information in a given OAS. Strict mode aimed to create a GraphQL wrapper that was complete and closely aligned with the target API 108, or no wrapper at all if that is impossible. In contrast, in non-strict mode, the OASGraph attempted to mitigate lacking and/or ambiguous information in a given OAS, leading to a working GraphQL wrapper that may slightly deviate from the target API 108. In non-strict mode, the OASGraph tracked causes for such cases and performed mitigations as warnings in a report, which can be made accessible to applications or developers. The GraphQL schema produced by OASGraph can be used by any GraphQL compliant JavaScript framework, like the express-graphql library to run the GraphQL wrapper as an Express.js application.

The OASGraph as well as Swagger2GraphQL, an open source tool with the same goal, were applied a large number of publicly available OAS to conduct one or more experiments that can demonstrate the efficacy and/or efficiency of the OASGraph. For both tools, the cause of errors that occurred during the experiments were assessed. In addition, for the OASGraph, warnings produced in non-strict mode were assessed to analyze to what degree the created GraphQL wrappers cover the target APIs 108 (e.g., REST and/or REST-like APIs 108).

For the experiments, 959 OAS were obtained from the APIs.guru OpenAPI Directory. In this directory, third parties maintain OAS 2.0 of popular APIs 108. These OAS are created by dedicated scripts that either translate other API 108 specification formats to OAS, or extract required information from (human-readable) API 108 documentations (typically written in HTML). APIs.guru runs these scripts weekly, and manually checks detected differences for correctness before committing them. In addition, error-fixes can be contributed by a larger community through pull requests on the directory's GitHub repository.

The OASGraph was run once in strict and once in non-strict mode, on all 959 OASs contained in the APIs.guru dataset. Additionally, Swagger2GraphQL, an existing open source tool that, was run on the 959 OASs.

FIG. 5 illustrates a diagram of example, non-limiting tables that can depict the results of the experiments performed with the OASGraph in accordance with one or more embodiments described herein. Repetitive description of like elements employed in other embodiments described herein is omitted for sake of brevity.

Table 500 summarizes the number of cases with and without errors when applying the OASGraph (both in strict and non-strict mode) and Swagger2GraphQL to the 959 OAS from the APIs.guru dataset. As shown in table 500, the OASGraph produces significantly more errors in strict mode, wherein just over a quarter of cases succeeded. On the other hand, in non-strict mode, wrapping an API 108 succeeds in over 95% of cases. The difference in these values motivates a detailed investigation into the mitigations performed by the OASGraph and thus the deviation of created GraphQL interfaces from their target APIs 108.

The result of Swagger2GraphQL, falls between that of OASGraph in strict and non-strict mode. Swagger2GraphQL can achieve more successful cases than the OASGraph in strict mode because it can silently mitigate issues with the input OAS that cause the OASGraph to fail in strict mode. For example, Swagger2GraphQL can silently create a "dummy" GraphQL object type if an operation does not define a valid response schema object, or it arbitrarily selects one HTTP status code for which to define a response type in case multiple codes are available. In both cases, the OASGraph provides an error in strict mode (and mitigates these issues with a warning in non-strict mode). As such, the number of APIs 108 for which Swagger2GraphQL succeeds to create a GraphQL wrapper would be smaller, if these cases were explicitly exposed. On the other hand, Swagger2GraphQL performs worse than the OASGraph in non-strict mode, as it, for example, does neither sanitize field, argument, and type names nor de-duplicate type names.

Table 502 depicts the types of errors produced by the OASGraph in non-strict mode and by Swagger2GraphQL. As shown in table 502, "invalid OAS" can mean that the input OAS could no be successfully validated (e.g., by the third-party library swagger2openapi used by the OASGraph. Since Swagger2GraphQL does not perform validation, it does not produce such errors. As shown in table 502, "sanitation error" can mean the sanitation of type, argument, or field names failed. The errors produced by the OAS Graph result from attempts to sanitize enumeration values of type boolean. While such enumeration values are valid in schemas objects, they are not valid in GraphQL enumeration types, specifically, the strings true and false are forbidden as enumeration values. Because Swagger2GraphQL does not perform sanitation, it does not produce such errors. As shown in table 502, "missing ref" can mean a reference cannot be resolved because it refers to relative documents which are not provided by APIs.guru. As shown in table 502, "name conflict" can mean GraphQL.js produces an error because multiple types share the same name. Because the OASGraph ensures unique names, it produces no such errors. As shown in table 502, "unknown schema type" can mean a schema object defines a type that does not match any (e.g., scalar) GraphQL type (e.g., undefined or file). In the OASGraph, such cases produce a warning rather than an error in non-strict mode, and the type is assumed to be string as a mitigation. As shown in table 502, "no get operation" can mean the given OAS does not contain any GET endpoints. The OASGraph does not produce an error in such cases because it can define an empty root query type if no GET operation is present. As shown in table 502, "unsanitized name" can mean the GraphQL.js produces an error due to unsanitized type or field names. Because the OASGraph performs sanitation, it produces no such errors. As shown in table 502, "invalid schema type" can mean a given schema object cannot be translated to a GraphQL type. As shown in table 502, "stack overflow" can mean JavaScript's maximum call stack is exceeded.

As can be seen, by far the most errors produced by Swagger2GraphQL are caused by GraphQL.js producing errors due to invalid type, argument, or field names. This finding underlines the importance of name sanitation as discussed in various embodiments herein. Additionally, a stark difference of results from running the OASGraph in strict vs. non-strict mode motivates a detailed look into the types of mitigations the OASGraph performs in non-strict mode. Overall, the OASGraph reports 10,673 warnings across all 930 APIs 108 that a GraphQL wrapper could be created for (called "wrappable" in the following). Of these, 260 APIs 108 could be wrapped without any warning (i.e., in strict mode) and the other 670 APIs 108 could be wrapped with at least one warning.

The warnings comprised 5178 missing response schema warnings, which can respectively mean an operation in the input OAS lacks a definition of a response or payload schema object. The OASGraph's workaround can be to ignore the operation, while Swagger2GraphQL can silently swallow such cases by generating a dummy "empty" default field of type string. Further, the warnings comprised 2502 multiple response warnings, which can respectively mean an operation defines more than one response where the HTTP status code indicates success. The OASGraph's workaround can be to select the lowest HTTP status code, while Swagger2GraphQL can silently swallow such cases by randomly selecting the last status code between 200 and 299 defined in the given OAS. Additionally, the warnings comprised 2950 invalid schema type warnings, which can respectively mean a payload and/or response schema object defined in the given OAS lacks a type, and/or is incomplete (e.g., the properties definition of an object is empty). The OASGraph's workaround can be to assume the type to be string. In consequence, clients can still receive such data as stringfield JSON. Moreover, the warnings can comprise 43 unknown schema type warnings, which can respectively mean a schema object has a type, but that type is unknown to the OASGraph (i.e., not object, array, string, number, or boolean). The OASGraph's workaround, again, can be to assume the type to be string.

The distribution of warnings across APIs 108, the experiment data presented in FIG. 5 can depict that the majority of wrappable APIs 108 can have either no or few warnings of any particular type. Specifically, for every type of warning depicted in table 502, half of the wrappable APIs 108 have at most one warning of said type. While warnings are relatively concentrated to certain APIs 108 when considered in isolation, they are less so when considered collectively. For example, half of the wrappable APIs 108 have over four warnings, and around one quarter of APIs 108 have over 10 warnings of any type. In other words, different APIs 108 tend to have different warnings. This conclusion aligns with the previous observation that only 28% (260) of wrappable APIs 108 produce no warnings at all. Depending on the type of warning, the OASGraph's mitigation strategies impact the completeness the generated GraphQL wrappers. For instance, the OASGraph can skip an operation on missing response schema warnings to ensure a fully usable wrapper rather than assume return codes and types and create a complete wrapper that will behave poorly. For nearly half (e.g., 459) of the wrappable APIs 108, all operations are translated. About a quarter (e.g., 255) of wrappable APIs 108 skip under 25% of operations, while around 12% (e.g., 113) skip 50% or more of operations. Finally, 7.7% (e.g., 72) of wrappable APIs 108 skip all operations (e.g., the resulting GraphQL wrappers are completely unusable and should be counted in addition to the 29 APIs 108 that OASGraph produced errors even in non-strict mode. One of ordinary skill in the art will readily recognize that the various experiments and results described herein exemplify, but do not limit, one or more embodiments described herein.

FIG. 6 illustrates a flow diagram of an example, non-limiting method 600 that can facilitate autonomously generating one or more graph query language schema in accordance with one or more embodiments described herein. Repetitive description of like elements employed in other embodiments described herein is omitted for sake of brevity.

At 602, the method 600 can comprise generating (e.g., via the interface component 110), via a system 100 operatively coupled to a process 122, a schema for a graph query language wrapper that can translate one or more queries to one or more requests against one or more target APIs 108. The schema generated at 602 can comprise a sanitation map 126 that can delineate a relation between a raw data format expected by the one or more target APIs 108 and a sanitized data format exposed by the graph query language wrapper.

At 604, the method 600 can comprise translating (e.g., via the resolve function component 202 and/or the nest component 302), via the system 100, a respective query to a plurality of requests against the one or more target APIs 108. The one or more requests translated at 602 can be comprised within the plurality of requests. Further, the plurality of requests can relate to each other in accordance to one or more link definitions in a machine-readable specification (e.g., an OAS) of the one or more target APIs 108. For example, the respective query can be a nested query that can facilitate multiple requests against the one or more target APIs 108.

Figure 7:
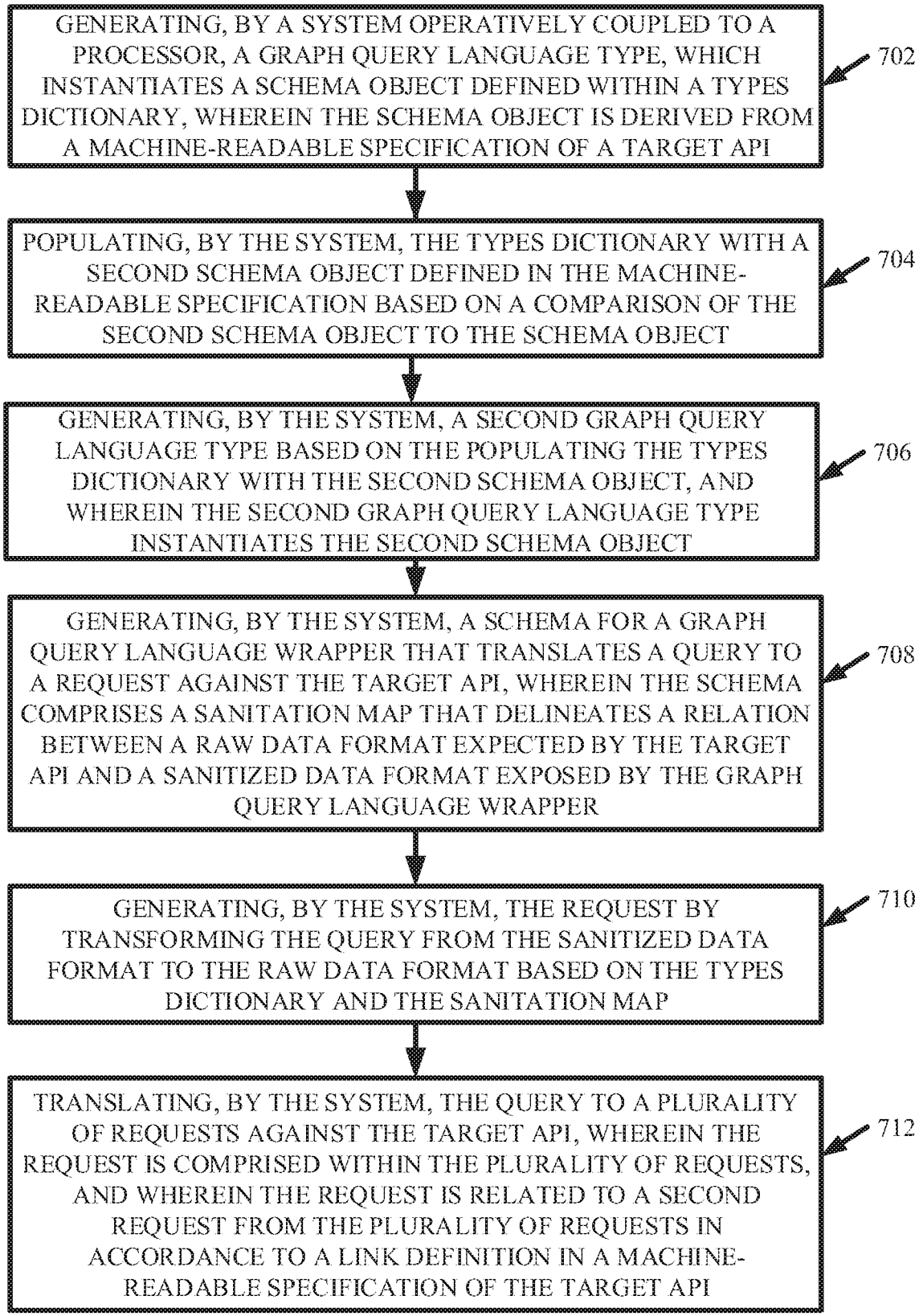
FIG. 7 illustrates a flow diagram of an example, non-limiting method that can facilitate autonomously generating one or more schema for one or more graph query language wrappers, which can translate one or more queries to one or more requests against a target application programming interface in accordance with one or more embodiments described herein.

FIG. 7 illustrates a flow diagram of an example, non-limiting method 700 that can facilitate autonomously generating one or more graph query language schema in accordance with one or more embodiments described herein. Repetitive description of like elements employed in other embodiments described herein is omitted for sake of brevity.

At 702, the method 700 can comprise generating (e.g., by the pre-processing component 114 and/or the translation component 116), by a system 100 operatively coupled to processor 122, one or more graph query language types, which can instantiate one or more schema objects defined within a types dictionary 124. The one or more schema objects can be derived from a machine-readable specification (e.g., OAS) of one or more target APIs 108.

At 704, the method 700 can comprise populating (e.g., by the pre-processing component 114 and/or the translation component 116), by the system 100, the types dictionary 124 with one or more additional schema objects defined in the machine-readable specification (e.g., OAS) based on a comparison of the one or more additional schema objects to the one or more schema objects of 702. Thus, a de-duplication process at 704 can populate the types dictionary 124 with unique schema objects and/or names.

At 706, the method 700 can comprise generating (e.g., by the pre-processing component 114 and/or the translation component 116), by the system 100, one or more additional graph query language types based on the populating the types dictionary 124 with the one or more additional schema objects. The one or more additional graph query language types can respectively instantiate the one or more additional schema objects.

At 708, the method 700 can comprise generating (e.g., via the interface component 110), via a system 100 operatively coupled to a process 122, a schema for a graph query language wrapper that can translate one or more queries to one or more requests against the one or more target APIs 108. The schema generated at 708 can comprise a sanitation map 126 that can delineate a relation between a raw data format expected by the one or more target APIs 108 and a sanitized data format exposed by the graph query language wrapper.

At 710, the method 700 can comprise generating (e.g., via the resolve function component 202), by the system 100, the request by transforming the query from the sanitized data format to the raw data format based on the types dictionary 124 and/or the sanitation map 126.

At 712, the method 700 can comprise translating (e.g., via the resolve function component 202 and/or the nest component 302), via the system 100, a respective query to a plurality of requests against the one or more target APIs 108. The one or more requests translated at 708 and/or 710 can be comprised within the plurality of requests. Further, the plurality of requests can relate to each other in accordance to one or more link definitions in a machine-readable specification (e.g., an OAS) of the one or more target APIs 108. For example, the respective query can be a nested query that can facilitate multiple requests against the one or more target APIs 108.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
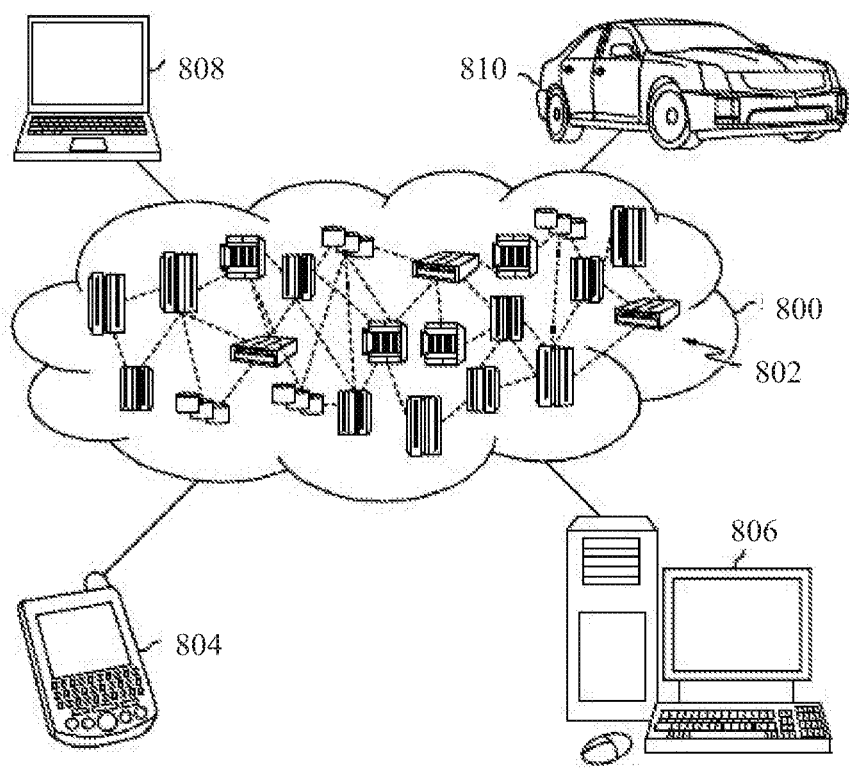
FIG. 8 depicts a cloud computing environment in accordance with one or more embodiments described herein.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
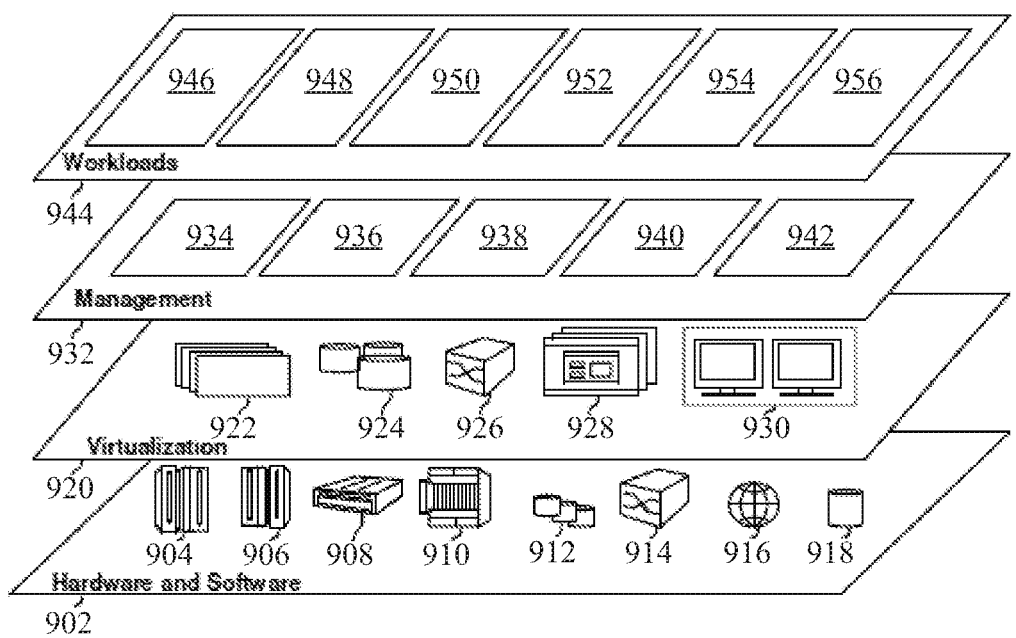
FIG. 9 depicts abstraction model layers in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and autonomous graph query language schema generation 956. Various embodiments of the present invention can utilize the cloud computing environment described with reference to FIGS. 8 and 9 to autonomously generating one or more graph query language schemas for one or more graph query language wrappers that can translate one or more queries to one or more requests against one or more target APIs 108.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
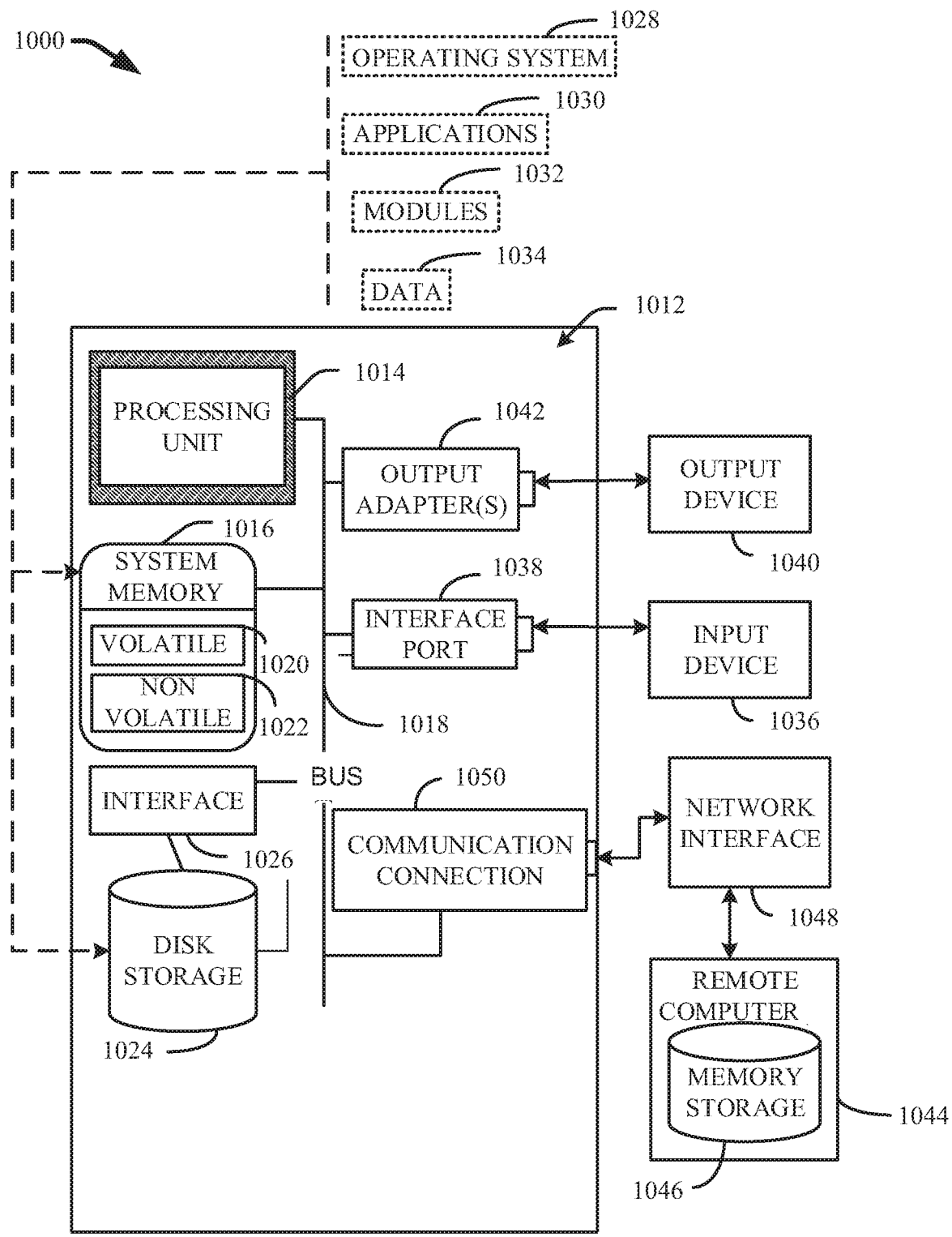
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an interface component, operatively coupled to the processor, that:
analyzes an open application programming interface specification document that describes, in a human readable text format, a target application programming interface, and
based on the analysis of the open application programming interface specification document:
performs a de-duplication process that populates a types dictionary with unique schema object types identified based on a comparison of fields within schema objects derived from the open application programming interface specification document, and
generates a schema for a graph query language wrapper that translates a query to a request against the target application programming interface, wherein the schema comprises a sanitation map that delineates a relation between a raw data format expected by the target application programming interface and a sanitized data format exposed by the graph query language wrapper.

2. The system of claim 1, further comprising:
a translation component, operatively coupled to the processor, that generates a graph query language type, which instantiates a schema object based on a schema object type defined within the types dictionary.

3. The system of claim 1, wherein the open application programming interface specification document describes operations of the target application programming interface based on respective unique combinations of information selected from a group consisting of: Uniform Resource Identifier, hypertext transfer protocol method, input data schema, output data schema, required parameters, and authentication mechanism.

4. The system of claim 1, further comprising:
a resolve function component, operatively coupled to the processor, that generates the request by transforming the query from the sanitized data format to the raw data format based on the types dictionary and the sanitation map.

5. The system of claim 4, wherein the resolve function component further receives a response to the request and transforms the response from the raw data format to the sanitized data format based on the types dictionary and the sanitation map.

6. The system of claim 4, further comprising:
a nest component, operatively coupled to the processor, that translates the query to a plurality of requests against the target application programming interface, wherein the request is comprised within the plurality of requests, and wherein the request is related to a second request from the plurality of requests in accordance to a link definition in the open application programming interface specification document.

7. The system of claim 1, wherein the open application programming interface specification document is in an HTML format.

8. The system of claim 2, wherein the translation component generates a second graph query language type, which instantiates a second schema object based on a second schema object type defined within the types dictionary.

9. The system of claim 1, wherein the interface component generates the schema via a cloud computing environment.

10. A computer-implemented method, comprising:
analyzing, by a system operatively coupled to a processor, an open application programming interface specification document that describes, in a human readable text format, a target application programming interface; and
based on the analysis of the open application programming interface specification document:
performing, by the system, a de-duplication process that populates a types dictionary with unique schema object types identified based on a comparison of fields within schema objects derived from the open application programming interface specification document, and generating, by the system, a schema for a graph query language wrapper that translates a query to a request against the target application programming interface, wherein the schema comprises a sanitation map that delineates a relation between a raw data format expected by the target application programming interface and a sanitized data format exposed by the graph query language wrapper.

11. The computer-implemented method of claim 10, further comprising:
generating, by the system, a graph query language type, which instantiates a schema object based on a schema object type defined within the types dictionary.

12. The computer-implemented method of claim 10, wherein the open application programming interface specification document is in an HTML format.

13. The computer-implemented method of claim 11, further comprising:
generating, by the system, a second graph query language type, which instantiates a second schema object based on a second schema object type defined within the types dictionary.

14. The computer-implemented method of claim 10, further comprising:
generating, by the system, the request by transforming the query from the sanitized data format to the raw data format based on the types dictionary and the sanitation map.

15. The computer-implemented method of claim 10, further comprising:
translating, by the system, the query to a plurality of requests against the target application programming interface, wherein the request is comprised within the plurality of requests, and wherein the request is related to a second request from the plurality of requests in accordance to a link definition in the open application programming interface specification document.

16. A computer program product that automatically generates a graph query language schema, the computer program product comprising a computer readable storage medium having program instructions embodied therewith, the program instructions executable by a processor to cause the processor to:
analyze, by a system operatively coupled to the processor, an open application programming interface specification document that describes, in a human readable text format, a target application programming interface; and
based on the analysis of the open application programming interface specification document:
performing a de-duplication process that populates a types dictionary with unique schema object types identified based on a comparison of fields within schema objects derived from the open application programming interface specification document, and
generate, by the system, a schema for a graph query language wrapper that translates a query to a request against the target application programming interface, wherein the schema comprises a sanitation map that delineates a relation between a raw data format expected by the target application programming interface and a sanitized data format exposed by the graph query language wrapper.

17. The computer program product of claim 16, wherein the program instructions further cause the processor to:
generate, by the system, a graph query language type, which instantiates a schema object based on a schema object type defined within the types dictionary.

18. The computer program product of claim 17, wherein the open application programming interface specification document is in an HTML.

19. The computer program product of claim 16, wherein the program instructions further cause the processor to:
generate, by the system, the request by transforming the query from the sanitized data format to the raw data format based on the types dictionary and the sanitation map.

20. The computer program product of claim 16, wherein the program instructions further cause the processor to:
translate, by the system, the query to a plurality of requests against the target application programming interface, wherein the request is comprised within the plurality of requests, and wherein the request is related to a second request from the plurality of requests in accordance to a link definition in the open application programming interface specification document.

* * * * *